(12) United States Patent
Ganslmeier et al.

(10) Patent No.: US 10,257,039 B2
(45) Date of Patent: Apr. 9, 2019

(54) ROUTER AND METHOD FOR RECEIVING AND DISTRIBUTING DATA

(71) Applicant: Audi AG, Ingolstadt (DE)

(72) Inventors: Thomas Ganslmeier, Bad Abbach (DE); Frank Oldewurtel, Hagen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/319,524

(22) PCT Filed: Jun. 2, 2015

(86) PCT No.: PCT/EP2015/001119
§ 371 (c)(1),
(2) Date: Dec. 16, 2016

(87) PCT Pub. No.: WO2015/192945
PCT Pub. Date: Dec. 23, 2015

(65) Prior Publication Data
US 2017/0207966 A1    Jul. 20, 2017

(30) Foreign Application Priority Data

Jun. 20, 2014    (DE) .......................... 10 2014 009 256

(51) Int. Cl.
*H04L 12/24*    (2006.01)
*H04L 12/40*    (2006.01)
(Continued)

(52) U.S. Cl.
CPC ...... *H04L 41/0816* (2013.01); *H04L 12/4625* (2013.01); *H04L 41/0803* (2013.01);
(Continued)

(58) Field of Classification Search
None
See application file for complete search history.

(56) References Cited

U.S. PATENT DOCUMENTS

| | | | |
|---|---|---|---|
| 5,811,897 | A | 9/1998 | Spaude et al. |
| 2001/0047517 | A1 | 11/2001 | Christopoulos et al. |

(Continued)

FOREIGN PATENT DOCUMENTS

| | | |
|---|---|---|
| DE | 19547560 A1 | 6/1997 |
| GB | 2474563 A | 4/2011 |

(Continued)

OTHER PUBLICATIONS

International Search Report and Written Opinion of the International Searching Authority directed to related International Patent Application No. PCT/EP2015/001119, dated Sep. 29, 2015, with attached English-language translation; 20 pages.

(Continued)

*Primary Examiner* — Noel R Beharry
*Assistant Examiner* — Nicole King
(74) *Attorney, Agent, or Firm* — Sterne, Kessler, Goldstein & Fox, PLLC (57) ABSTRACT

A router configured to receive and distribute data comprises a capability parameter receiver configured to receive capability parameters from at least two devices that are connected to the router. Moreover, the router includes a device configurator configured to select and/or configure at least one of the devices under consideration of the capability parameters. Furthermore, the router includes a payload receiver to receive data from at least one of the devices, and a payload distributor to distribute data to at least one of the devices. Moreover, the invention concerns a corresponding method for receiving and distributing data. Moreover, a vehicle with a router according to the invention is provided.

20 Claims, 3 Drawing Sheets

(51) Int. Cl.
*H04L 12/46* (2006.01)
*H04L 29/06* (2006.01)
*H04L 29/08* (2006.01)

(52) U.S. Cl.
CPC .............. *H04L 69/08* (2013.01); *H04L 67/12* (2013.01); *H04L 2012/40273* (2013.01)

(56) References Cited

U.S. PATENT DOCUMENTS

| | | |
|---|---|---|
| 2004/0248513 A1 | 12/2004 | Glass et al. |
| 2005/0136958 A1* | 6/2005 | Seshadri ............. H04M 1/6066 455/519 |
| 2006/0267860 A1 | 11/2006 | Rinaldo, Jr. et al. |
| 2011/0211584 A1 | 9/2011 | Mahmoud |
| 2011/0294500 A1* | 12/2011 | Chang ............... H04W 52/0229 455/426.1 |
| 2012/0005360 A1 | 1/2012 | Li et al. |
| 2012/0137320 A1* | 5/2012 | Mugulavalli ........ H04N 21/222 725/25 |
| 2012/0206645 A1 | 8/2012 | Ozawa |
| 2014/0349569 A1* | 11/2014 | Hyde ................... H04B 7/1555 455/11.1 |
| 2014/0369275 A1 | 12/2014 | Fleck et al. |
| 2016/0241620 A1* | 8/2016 | Zhu ....................... H04W 40/18 |

FOREIGN PATENT DOCUMENTS

| | | |
|---|---|---|
| WO | WO 2010/045652 A2 | 4/2010 |
| WO | WO 2013/025786 A1 | 2/2013 |
| WO | WO 2013/098297 A1 | 7/2013 |

OTHER PUBLICATIONS

International Preliminary Report on Patentability directed to related International Patent Application No. PCT/EP2015/001119, dated May 10, 2016, with attached English-language translation; 14 pages.

\* cited by examiner

ROUTER AND METHOD FOR RECEIVING AND DISTRIBUTING DATA

TECHNICAL FIELD

The present invention concerns a router for receiving and distributing data.

Moreover, the invention concerns a vehicle having a router for receiving and distributing data. The vehicle may be a personal motor vehicle, a bus, a truck, a construction machine, an agricultural machine, a rail vehicle, an elevator, a water vehicle or an aircraft.

Moreover, the invention concerns a method for receiving and distributing data.

BACKGROUND

US 2012/0 005 360 A1 describes a method for automatically detecting devices. A gateway hereby sends out one discovery message per broadcast and waits for responses from user devices to the broadcast discovery message. Moreover, it is provided that it is established whether the user device has been recognized.

US 2012/0 206 645 A1 describes a collection device for content on a mobile network that provides content to a participant device.

US 2001/0 047 517 A1 describes methods and devices for preparing and converting data that depict different multimedia content.

WO 2013/025786 A1 describes a smartphone that is used as a gateway between a remove system and a base computer.

US2004/0248513 A1 describes a communication system that has a detection component and a configuration component. The detection component is designed to detect multiple devices that are connected with one another via an activated medium. The configuration component is designed to configure a configuration between a subset of the devices.

DETAILED DESCRIPTION

Modern devices for the most part use their own "ecosystem" and different communication technologies. Therefore, a networking and usage of different devices that is simple and comprehensive (without interruption of media) is normally impossible today. The consequence is therefore that a significant additional benefit of a largely seamless transfer of information and media between heterogeneously distributed devices, which transfer is technically possible in principle, goes unutilized.

It is an object of the present invention to provide a router with which mixed usage of communication devices, entertainment devices, navigation devices and data processing devices is possible in a more user-friendly manner than is possible with known routers.

This object is achieved according to the invention via a router, a vehicle including the router and a method for receiving and distributing data. Additional developments of the present inventions are specified in the dependent claims.

According to the present invention, a router is provided for receiving and distributing data, which router has a capability parameter receiver, a device configurator, a payload receiver and a payload distributor. The capability parameter receiver is designed to receive capability parameters from at least two devices that can be connected to the router. The device configurator is designed to select and/or configure at least one of the devices under consideration of the capability parameters. The payload receiver is designed to receive data from at least one of the devices. The payload distributor is designed to distribute data to at least one of the devices. The router is part of a mobile telephone, an implant, a watch, eyeglasses, a hearing aid, a belt, an ankle monitor, a piece of jewelry, a piercing, a bracelet and/or another article of clothing, and is prepared to locate, reveal and/or identify the user in relation to devices that are located in the environment of the user. For example, a first of the at least two devices that can be connected to the router may be connectable to the router via a wired connection, or via an optical waveguide, or via a wireless connection. For each additional device that can be connected to the router, it is the case that it may be connectable to the router via a wired connection, or via an optical waveguide, or via a wireless connection.

A corresponding vehicle has a router according to the invention.

Accordingly, the method according to the invention for receiving and distributing data includes the following steps: transmission of capability parameters of at least two devices that are connected to a router; selection and/or configuration of at last one of the devices under consideration of the capability parameters; receipt of data from at least one of the devices, and distribution of received data to at least one of the devices. The router is part of a mobile telephone, an implant, a watch, eyeglasses, a hearing aid, a belt, an ankle monitor, a piece of jewelry, a piercing, a bracelet and/or another article of clothing, and is prepared to locate, reveal and/or identify the user in relation to devices that are located in the environment of the user.

A concept of the present invention may be seen in that, before receiving data at the router, at least one of the devices that can be connected to the router is selected under consideration of the capability parameters; and/or in that, before the distribution of data, at least one of the devices that can be connected to the router is selected under consideration of the capability parameters. Via this measure, an operation of the router may be optimally adapted to capabilities of currently available devices which represent data sources and data sinks for the router.

In a preferred embodiment, the capability parameter includes a specification of an information and/or media type, a specification of a protocol, a specification of a display size, a specification of a resolution capability, a specification of a bandwidth and/or a specification of a mode of operation. A selection and/or configuration of the devices may hereby be optimally adapted to a currently offered information and/or media type, a currently available protocol, a currently available display size, a currently available resolution capability, a currently available bandwidth and/or a current specification of a mode of operation.

Independently of these, the router may have a device configurator to select and/or configure one of the devices that can be connected to the payload receiver and/or to the payload distributor. An interface adaptation and/or a protocol adaptation of the device to an interface internal to the router may hereby be implemented. The device configurator may be prepared to select and/or to configure at least one of the devices (that can be connected to the payload receiver and/or to the payload distributor) under consideration of requirements of a user, and/or under consideration of a selection algorithm and/or of a configuration algorithm (for example an auto-configuration algorithm). The configuration (or the configuration algorithm) may include the selection (or the selection algorithm).

Moreover, it may be advantageous if the router has a first protocol converter to convert data that are encoded according to a first protocol into data that are encoded according to a second protocol. The first protocol converter is typically prepared for a conversion from a first protocol supported by a device into an internal protocol (second protocol). For example, the first protocol converter may be prepared for a conversion of one or more lower layers of a more comprehensive protocol stack according to which the data are encoded.

A particularly preferred development provides that the router has a second protocol converter to convert data that are encoded according to a second protocol into data that are to be dispatched via the first protocol converter, which data are encoded according to a third protocol. Via a simultaneous application of the two aforementioned measures, an indirect transfer of data from a first device to a second device is possible, wherein the data transfer may take place at the connection interfaces for the two devices according to an identical protocol or according to two different protocols. An indirect transfer of data from a first device to the same first device may thus also take place, wherein the data transfer takes place at different connection interfaces of the first device according to two different protocols. For example, the second protocol converter may be prepared for a conversion of one or more upper layers of a more comprehensive protocol stack according to which the data are encoded.

Particular advantages result if the router has at least one (preferably multiple) of the following interfaces: a Local Area Network (LAN) interface, a Wireless LAN (WLAN) interface, a mobile communications interface, a Bluetooth interface, a Near Field Communication (NFC) interface, and/or is a Zigbee interface. The router hereby provides at least one of the interfaces that is typical today for input devices and/or output devices. Devices that can be connected to the router via radio and/or cable are, for example, entertainment devices (for example television devices), communication devices (for example smartphones), data processing devices (for example notebooks), intelligent clothing (for example augmented reality eyeglasses and/or virtual reality eyeglasses; body sensors; smartwatches), navigation devices and infotainment devices from the automotive field.

It may also be appropriate if the first protocol is a LAN protocol, a WLAN protocol, a mobile communications protocol, a Bluetooth protocol, an NFC protocol or a Zigbee protocol, and/or if the second protocol is a LAN protocol, a WLAN protocol, a mobile communications protocol, a Bluetooth protocol, an NFC protocol or a Zigbee protocol. The router hereby supports at least one of the protocols that is typical today for input devices and/or output devices.

The router is part of a mobile device, a mobile telephone, an implant, a watch, eyeglasses, a hearing aid, a belt, an ankle monitor, a piece of jewelry, a piercing, a bracelet and/or another article of clothing. This makes it easier for a user to constantly carry the router with him or her.

It is advantageous if the router comprises at least two partial devices that are mechanically separate from one another and are connected with one another via at least one of the following interfaces: a radio interface, an infrared interface, an ultrasound interface. For example, one of the two partial devices may be an article that a user typically wears directly on the body (for example a wristwatch, a finger ring, an ankle monitor, a piercing, a bracelet, eyeglasses, a hearing aid or an implant). A strong physical bond of the first partial device (and thus of at least one part of the router) to the body of the user may thus be achieved. The other of the two partial devices may, for example, then be a somewhat more voluminous device that the user likewise normally carries with him or herself (apart from exceptional situations), for example a smartphone or a belt. If the other partial device is more voluminous than the first partial device, it is if anything possible to arrange the electronics and power supply that are required for the router in the partial device.

Figure 1:
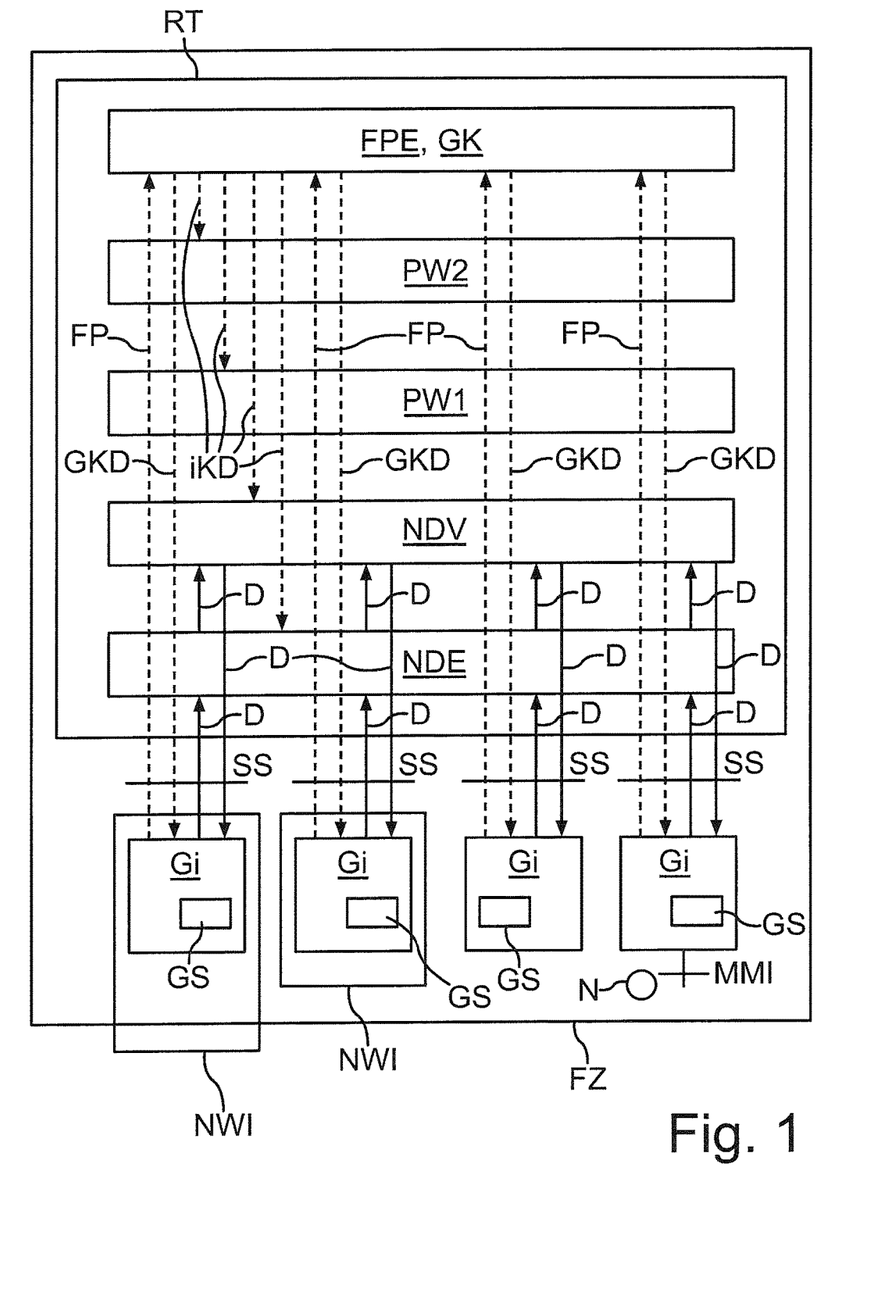
FIG. 1 illustrates a schematic block diagram with the router and networks and devices connected to the router.
Figure 2:
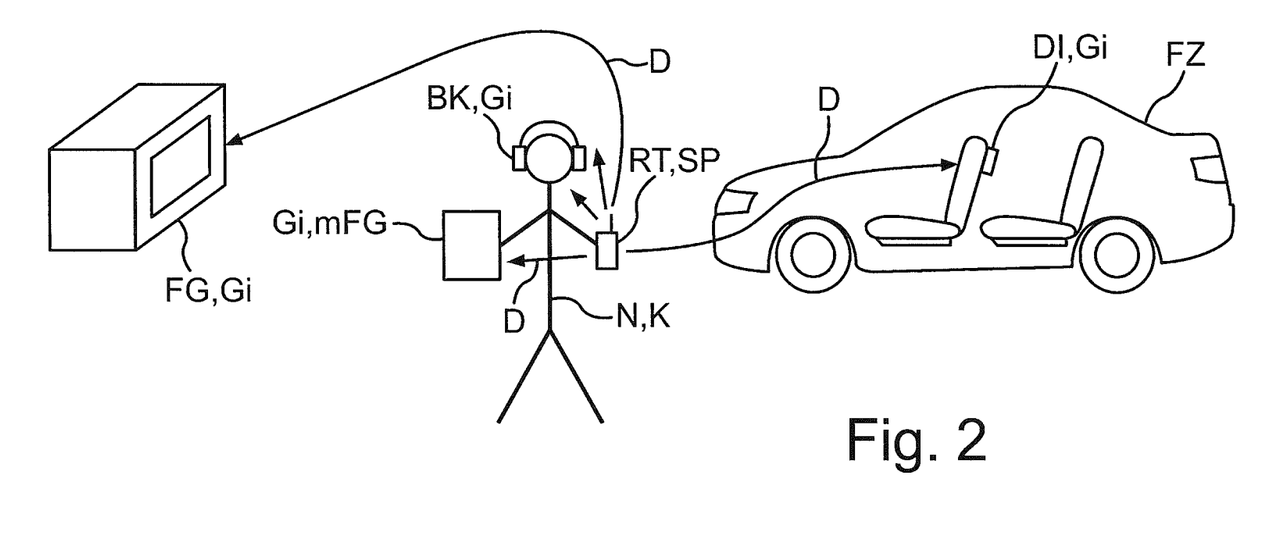
FIG. 2 illustrates a schematic application scenario for a router.

The present invention is now explained in detail using the accompanying drawings, which respectively present an example. Thereby shown are:

FIG. 1 schematically, a block diagram with the router and networks and devices connected to the router;

FIG. 2 schematically, an application scenario for a router; and

Figure 3:
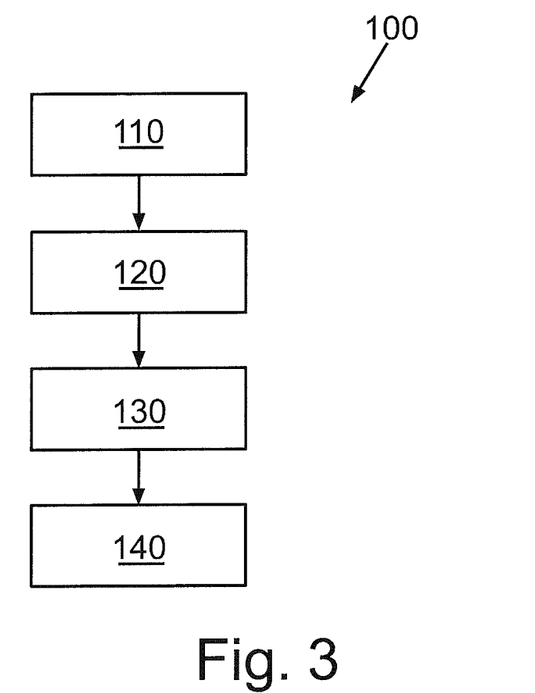
FIG. 3 illustrates a schematic workflow of a method for receiving and distributing data.

FIG. 3 schematically, a workflow of a method for receiving and distributing data.

The exemplary embodiments described in detail in the following represent preferred embodiments of the present invention.

The router RT shown in FIG. 1 normally comprises the following components: a capability parameter receiver FPE, a payload receiver NDE, a payload distributor NDV, and a device configurator GK. The router RT typically also has a first protocol converter PW1 and a second protocol converter PW2.

The first protocol converter PW1 typically serves for a conversion of a first protocol supported by a device into an internal protocol (second protocol). The first protocol converter PW1 may thus be viewed as a protocol abstractor.

The second protocol converter PW2 typically serves for a conversion of the second protocol into a third protocol supported by a device. The cascading of the first protocol converter PW1 and second protocol converter PW2 thus forms a transcoder that is prepared to transcode data. By means of the transcoder, a data format may be adapted to capabilities of different devices Gi. Devices Gi that use different communication methods may thus exchange payload streams. The data streams from devices Gi connected to the router RT to devices connected to the router RT may be exchanged via the router RT. Alternatively or additionally, the data streams from devices Gi connected to the router RT to devices Gi connected to the router RT may—transmitted via a transmission path—be initialized, organized, controlled and/or monitored by the router RT. The data format may include any features of a data encoding (for example a chronological order of information elements, check bits, header fields, signaling information, metadata that are to be transferred).

For example, what is understood here by transcoding is an adaptation of a data format (for example an Advanced Audio Coding (AAC) encoding method to an MP3 encoding method), wherein a bit rate and/or a compression rate of a data stream and/or a resolution for an output to a display is adapted. Transcoding may be understood as a transformation of the data stream from an application standpoint. For example, in order to support a communication between WLAN devices and Bluetooth devices by means of the router RT, the router RT may have both at least one communication interface for WLAN and at least one communication interface for Bluetooth. For example, the router RT may then receive from a WLAN device via the WLAN interface and suitably transform the received WLAN data for Bluetooth. This transformation may be designated as a protocol translation. The router RT may then send data that are suitably transformed for Bluetooth to a Bluetooth device via its Bluetooth interface SS. This may be viewed as a transformation from a communication standpoint.

The information flow between a first device Gi and a second device Gi (that are respectively connected to the router) is typically as follows:

The payload receiver NDE transmits data D that are provided by the first device Gi according to a first protocol to a first interface SS, the first protocol converter PW1. The first protocol converter PW1 converts these data D into a second protocol, and then transmits the data D encoded according to the second protocol to the protocol distributor NDV and/or to the second protocol converter PW2. In the first alternative, the NDV provides the data D encoded according to the second protocol to a second device Gi via a second interface SS.

In the second alternative, the second protocol converter PW2 converts the data D encoded according to the second protocol into a third protocol, and transmits the data D encoded according to the third protocol to the first protocol converter PW1. The first protocol converter PW1 then converts these data (which are encoded according to the third protocol, into a protocol that is matched to the interface SS to which the second device Gi is connected, and then transmits these data D to the payload distributor NDV. The payload distributor NDV then provides the converted data D to the second device Gi via a second interface SS.

The first protocol converter PW1 typically comprises multiple instances. The same applies to the second protocol converter PW2.

For the sake of clarity, in FIG. 1 an explicit depiction of the data flows between NDE and PW1, between PW1 and PW2, between PW2 and PW1, and between PW1 and NDV has been omitted.

The first protocol converter PW1 may optionally comprise a first format converter. The second protocol converter PW2 may likewise optionally comprise a second format converter. A format conversion in the broadest sense is also presently viewed as a protocol conversion. The format conversion may also include a change of a resolution or bandwidth. The format conversion may also include a splitting up of a data stream (for example a division of a video data stream into an audio data stream and an image data stream). A video may thus be played back, chronologically synchronized, at different devices Gi (for example, the full-motion video via a television device FG and an audio data stream via headphones BK that have a Bluetooth interface).

The capability receiver FPE is prepared to receive, from devices Gi that connect or are connected with the router RT, information about their capabilities. The capability information may, for example, be information about a display size, about information and/or media types, about formats, and/or about input/output types that are supported by the respective device Gi.

The device configurator GK is prepared to create device-specific device configuration data GKD based on capabilities reported by the devices Gi, and to dispatch the device configuration data GKD to the respective device Gi. The device configuration data GKD take into account the reported capabilities of the devices Gi that are reported to the router RT. The device configurator GK preferably adapts the device configuration data GKD dynamically to variable availabilities and/or capabilities of the devices Gi, and/or to variable properties of the data to be transferred. The configuration of the respective device Gi may also take place entirely or partially by means of setting up a situation-dependent user interface (for example for a display unit DI (see FIG. 2) and/or a control unit). In addition to the device configuration data GKD, internal configuration data iKD are typically also provided for configuration of the first protocol converter PW1 and/or second PW2, the payload receiver NDE and the payload distributor NDV.

The router RT typically has interfaces SS for different interface standards. The router RT may be connected with external devices Gi insofar as they have a matching interface SS. In order to make an external device Gi connectable with the router RT, a Software Development Kit may be provided with which the manufacturer of the device Gi may integrate one or more interfaces SS of the router RT into a device software GS of the external device Gi. A wireless communication between devices Gi having different interfaces SS may hereby be enabled. Alternatively or additionally, the router RT may also be prepared to divide up a data stream to different devices Gi by means of demultiplexing. Alternatively or additionally, the router RT may also be prepared to feed multiple data streams to a single device Gi by means of multiplexing. The selection and/or configuration of data sources and data sinks may be realized entirely or partially by means of the respective devices Gi to which individual device configuration data GKD are provided by means of the router RT. The device configuration data GKD are created by the router RT according to the capabilities of the device Gi.

Devices that can be connected to the router RT via radio and/or cable are, for example, entertainment devices (for example television devices), communication devices (for example smartphones), data processing devices (for example notebooks), intelligent clothing (for example augmented reality eyeglasses and/or virtual reality eyeglasses; body sensors; smartwatches), navigation devices, and infotainment devices from the automotive field.

Information and/or media content may be distributed and played back by the router RT, largely independently of the device. Operation and display may be adapted dynamically and corresponding to the available devices Gi and their capabilities.

The router RT may be a mobile device, a mobile telephone, an implant, a watch, eyeglasses, a hearing device, a belt, an ankle monitor, a piece of jewelry, a piercing, a bracelet and/or another article of clothing. The router RT may be connected with the body K of a user N on a removable face, or be firmly connected.

A complete and highly integrated networking of heterogeneous devices Gi is possible via application of the described router RT and the described method 100. Access to much information and media in the entire system GS is possible. The described router RT and the described method 100 enable a data flow (without media interruption) across system areas in which a use of different data formats and/or different communication protocols is provided. By means of the router RT, the user N may establish a link with multiple networks NW and devices Gi that are located in his or her current environment. Preferably, at least one public and/or at least one non-public cellular radio network (for example a network according to a GSM, UMTS and/or LTE standard) also belongs among the multiple networks NW.

The router RT typically has a digital identity that preferably can be secured by means of security mechanisms.

A particularly preferred option provides that the router RT is individually associated with a user N. The user N may then reveal and/or identify him or herself by means of the router RT to devices Gi and establish a link with one or more currently available networks NWi and one or more currently available devices Gi.

A development provides that the digital identity of the router RT is valid as a digital personality of the user for an online storage.

If the router RT is continuously located with the respective user N, the router RT may be used as a personalized (personal) integration point. The router RT is therefore part of an article that the user typically constantly carries with him or herself. Given current technical possibilities, this article may be a mobile telephone, for example. Even better suited as a personalized (personal) integration point are articles that are physically even more strongly bound to a user N than a smartphone SP, for example a finger ring, a piercing, a wristwatch, a bracelet, eyeglasses, a hearing aid or an implant.

Personalized (personal) connections PVi to many devices Gi, to the Internet and to many different networks NWi (for example Internet, vehicle, home network) may be established with the router RT. For this, the router RT may be equipped with communication capabilities that are common and/or important to the individual user N. The router RT may have the capability to communicate between these technologies by means of protocol translation. For example, nowadays wireless technologies such as WLAN and Bluetooth are important in order to simply and flexibly achieve a coupling with a multitude of diverse consumer devices Gi.

A development may provide that devices Gi connected to the router RT are automatically personalized (meaning are associated with the user N with whom the router RT is associated), or their identity in the router RT is personalized, given an establishment of a connection of the respective device Gi with the router RT (by means of a token, for example).

Via the transmission paths, the router RT may access many distributed items of information and media, may prepare these and make them available to many devices Gi located in the system. Information may thereby be distributed to various devices Gi.

For example, an operation of the router RT may be provided via intelligent clothing and sports articles. For example, an output of image and/or text information may take place by means of Augmented Reality Eyeglasses ARB or by means of a mobile television device FGm and/or via a vehicle display DI. With an adapted man-machine interface MMI, functions of the router RT that are frequently used may be operated by multiple connected devices Gi (at different functional levels). Core functions of the router RT may be remotely controlled and operated with adapted man-machine interface MMI by at least one of the connected devices Gi at different functional levels.

The use of the router RT described here enables a complete and highly integrated networking of heterogeneous devices Gi which offers access to any information or media in the entire system. This enables a seamless information transfer across different domains. The central component is what is known as a router RT with which a user N digitally identifies him or herself and may establish a link with arbitrary networks NWi and devices Gi.

The router RT forms a digital identity and acts as a personalized integration point. For this, it is advantageous if it is continuously located with the respective user N. For this, the router RT is ideally embedded in an environment that is strongly bound to the person. At the present time, this may be a smartphone SP, for example. Even more advantageous are articles that are even more strongly bound to the body K of user N, for example a finger ring, a piercing, a wristwatch, a bracelet, eyeglasses, a hearing aid or an implant.

The router RT has the object of establishing a personalized connection (token)—an Internet connection, for example—and connecting arbitrary physical devices Gi and networks NWi (for example Internet, vehicle network, home network). For this, the router RT may be equipped with the essentially widespread communication technologies and have the capability of communicating between different network technologies by means of protocol translation. For example, nowadays wireless technologies such as WLAN and Bluetooth are important in order to simply and flexibly achieve a coupling with a multitude of consumer devices Gi. By means of a connection with the router RT, the connected devices Gi are automatically personalized (for example by means of tokens) and connected with currently available networks NWi. A digital identity of the router RT, such as a digital personality of a user Ni, may be used with an online storage.

Via the communication paths, the router RT may access distributed information and media, may prepare these and make them available to all devices Gi located in the system. Information may thereby be distributed to various devices Gi.

The usage scenario shown in FIG. 2 for a use of the router RT for rear seat entertainment provides that a display DI of the vehicle FZ, a smartphone SP, a smartwatch SW and Bluetooth headphones BK are connected to the router RT. The smartphone SP is located in a briefcase, for example, and contains video and audio data. For example, the smartphone SP transmits the following capability information to the router RT: a display size, loudspeaker availability, camera type, touchscreen type and content available to the device, for example information and media.

The display DI of the rear seat entertainment system transmits the following capability information: display size and loudspeaker availability. The smartwatch SW transmits the following capability information: display size, control button availability, touchscreen type. The Bluetooth headphones BK transmit the following capability information: loudspeaker, hardware button.

The following device configurations are created for the stay of a user N in the rear seat region and transmitted to the devices Gi. Media, control functions and display contents are selected for the smartphone. For example, no device configuration possibility exists for the display DI. Media, control functions and display contents are selected for the smartwatch SW. For example, no device configuration possibility exists for the headphones BK.

By means of a user interface BS of the smartphone SP or of the smartwatch SW, the user N may search through media of the smartphone SP and select whether and how they should be played back. Many combinations are possible due to routing capabilities and transcoding capabilities of the router RT.

If the medium is a video, the user N may select whether the image is output at the smartphone SP, the smartwatch SW, or on a display DI of the rear seat entertainment system RSE.

If the medium is an audio file, the user N may select whether the audio file is output via the smartphone SP, via a display of the rear seat entertainment system RSE, or via headphones with Bluetooth interface.

If the user N is at home, the smartphone SP may still be the media supplier. However, the display DI of the rear seat entertainment system RSE is no longer located within range of the router RT. Instead of the rear seat entertainment system RSE, the television device FG transmits its capabilities to the router RT and receives its device configuration GK (for example resolution, audio, remote control) from the router RT. The video, including the audio data, may now be transmitted (streamed) via the router RT (a smartwatch, for example) to the television device FG, which has a higher resolution than the display DI of the rear seat entertainment system RSE.

The method 100 shown in FIG. 3 for receiving and distributing data D includes the following steps. In a first step 110, first capability parameters FP are transmitted from at least two devices Gi that are connected to a router RT. In a second step 120, at least one of the devices Gi is selected and/or configured under consideration of the capability parameters FP. In a third step 130, data D are received from at least one of the devices Gi. In a fourth step 140, received data D are distributed to at least one of the devices Gi.

The proposed method 100 for receiving and distributing data D offers at least one of the following advantages: supporting multiple wired and/or wireless communication technologies; providing open interfaces for data communication and control of different devices (in particular end devices); protocol translation from and to different protocol standards; wireless access to information in a distributed system; collection, preparation and provision of information; and reproduction of a digital identity.

The router RT according to the invention enables a seamless exchange of information across system boundaries. Moreover, individual devices Gi may be personalized by means of the router RT. The inventive concept may also promote a natural interaction of man and technology in which the hands of a user N remain as free as possible.

The invention claimed is:

1. A router for receiving and distributing data, the router comprising:
   a capability parameter receiver configured to receive capability parameters from at least two devices configured to be connected to the router;
   a device configurator configured to select and/or configure at least one of the at least two devices based on the capability parameters;
   a payload receiver configured to receive first data from the at least one of the at least two devices; and
   a payload transmitter configured to distribute second data, which is based on the first data, to another one of the at least two devices,
   wherein the router is part of a mobile telephone, an implant, a watch, eyeglasses, a hearing aid, a belt, an ankle monitor, a piece of jewelry, a piercing, a bracelet and/or another article of clothing, and is configured to locate, reveal and/or identify a user in relation to the at least two devices that are located in an environment of the user, and
   wherein the device configurator is further configured to create device-specific device configuration data based on the capability parameters, and to dispatch the device-specific device configuration data to a respective one of the at least two devices.

2. The router of claim 1, wherein the capability parameters comprise a specification of an information and/or media type, a specification of a protocol, a specification of a display size, a specification of a resolution capability, a specification of a bandwidth, and/or a specification of a mode of operation.

3. The router of claim 1, wherein the at least two devices are configured to be connected to the payload receiver and/or to the payload transmitter.

4. The router of claim 1, further comprising:
   a first protocol converter configured to convert the first data that is encoded according to a first protocol into third data that is encoded according to a second protocol.

5. The router of claim 4, further comprising:
   a second protocol converter configured to convert the third data that is encoded according to the second protocol into the second data that is to be dispatched via the first protocol converter, wherein the second data to be dispatched is encoded according to a third protocol.

6. The router of claim 4, wherein at least one of the first protocol and the second protocol is a LAN protocol, a WLAN protocol, a mobile communications protocol, a Bluetooth protocol, an NFC protocol or a Zigbee protocol.

7. The router of claim 1, further comprising:
   at least two partial devices that are mechanically separate from one another and are connected with one another via a radio interface, an infrared interface, or an ultrasound interface.

8. The router of claim 1, wherein the device configurator is further configured to provide internal configuration data to the payload receiver or the payload transmitter to configure the payload receiver or the payload transmitter.

9. The router of claim 1, wherein the router is part of an implant, a watch, eyeglasses, a hearing aid, a belt, an ankle monitor, a piece of jewelry, a piercing, a bracelet or another article of clothing.

10. The router of claim 1, wherein the device configurator is configured to select the at least one of the at least two devices based on the capability parameters.

11. The router of claim 1, wherein the payload receiver is configured to receive the first data from the at least one of the at least two devices after the capability parameter receiver receives the capability parameters and the device configurator selects and/or configures the at least one of the at least two devices based on the capability parameters.

12. The router of claim 1, wherein the device configurator is further configured to dynamically adapt the device-specific device configuration data in response to variable capabilities reported by the at least two devices and the first data.

13. A vehicle, comprising:
   a router configured to receive and distribute data, the router comprising:
      a capability parameter receiver configured to receive capability parameters from at least two devices configured to be connected to the router;
      a device configurator configured to select and/or configure at least one of the at least two devices based on the capability parameters;
      a payload receiver configured to receive first data from the at least one of the at least two devices; and
      a payload transmitter configured to distribute second data, which is based on the first data, to another one of the at least two devices,
      wherein the router is part of a mobile telephone, an implant, a watch, eyeglasses, a hearing aid, a belt, an ankle monitor, a piece of jewelry, a piercing, a bracelet and/or another article of clothing, and is configured to locate, reveal and/or identify a user in relation to the at least two devices that are located in an environment of the user, and wherein the device configurator is further configured to create device-specific device configuration data based on the capability parameters, and to dispatch the device-specific device configuration data to a respective one of the at least two devices.

14. The vehicle of claim 13, wherein the capability parameters comprise a specification of an information and/or media type, a specification of a protocol, a specification of a display size, a specification of a resolution capability, a specification of a bandwidth, and/or a specification of a mode of operation.

15. The vehicle of claim 13, wherein the at least two devices are configured to be connected to the payload receiver and/or to the payload transmitter.

16. The vehicle of claim 13, wherein the router further comprises:

a first protocol converter configured to convert the first data that is encoded according to a first protocol into third data that is encoded according to a second protocol.

17. The vehicle of claim 16, wherein the router further comprises:

a second protocol converter configured to convert the third data that is encoded according to the second protocol into the second data that is to be dispatched via the first protocol converter, wherein the second data to be dispatched is encoded according to a third protocol.

18. The vehicle of claim 13, wherein the router further comprises:

at least two partial devices that are mechanically separate from one another and are connected with one another via a radio interface, an infrared interface, or an ultrasound interface.

19. A method for receiving and distributing data, the method comprising:

receiving capability parameters from at least two devices configured to be connected to a router, wherein the router is part of a mobile telephone, an implant, a watch, eyeglasses, a hearing aid, a belt, an ankle monitor, a piece of jewelry, a piercing, a bracelet and/or another article of clothing, and is configured to locate, reveal and/or identify a user in relation to the at least two devices that are located in an environment of the user;

selecting and/or configuring at least one of the at least two devices based on the capability parameters;

receiving first data from the at least one of the at least two devices;

distributing second data, which is based on the first data, to another one of the at least two devices; and creating and dispatching device-specific device configuration data to a respective one of the at least two devices based on the capability parameters.

20. The method of claim 19, further comprising:

converting the first data that is encoded according to a first protocol into third data that is encoded according to a second protocol; and converting the third data that is encoded according to the second protocol into the second data that is to be dispatched via a first protocol converter, wherein the second data to be dispatched is encoded according to a third protocol.

* * * * *